(12) United States Patent
Zhou et al.

(10) Patent No.: US 10,685,215 B2
(45) Date of Patent: Jun. 16, 2020

(54) METHOD AND APPARATUS FOR RECOGNIZING FACE

(71) Applicant: Baidu Online Network Technology (Beijing) Co., Ltd., Beijing (CN)

(72) Inventors: Dingfu Zhou, Beijing (CN); Ruigang Yang, Beijing (CN); Yanfu Zhang, Beijing (CN); Zhibin Hong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 143 days.

(21) Appl. No.: 16/131,308

(22) Filed: Sep. 14, 2018

(65) Prior Publication Data
US 2019/0163959 A1    May 30, 2019

(30) Foreign Application Priority Data

Nov. 24, 2017   (CN) .......................... 2017 1 1195454

(51) Int. Cl.
*G06K 9/00*     (2006.01)
*G06T 7/13*     (2017.01)
(Continued)

(52) U.S. Cl.
CPC ..... *G06K 9/00255* (2013.01); *G06K 9/00268* (2013.01); *G06K 9/2036* (2013.01); *G06K 9/4628* (2013.01); *G06K 9/48* (2013.01); *G06K 9/6202* (2013.01); *G06K 9/6256* (2013.01); *G06K 9/6273* (2013.01);
(Continued)

(58) Field of Classification Search
CPC .... G06K 9/00255; G06K 9/2036; G06K 9/48; G06K 9/6273; G06K 9/4628; G06K 9/6288; G06K 9/6202; G06K 9/6256; G06K 9/00268; G06K 9/00228; G06T 7/13; G06T 7/174; G06T 2207/10048; G06T 2207/10152; G06T 2207/20084;
(Continued)

(56) References Cited

U.S. PATENT DOCUMENTS 5,642,431 A  *  6/1997  Poggio ............... G06K 9/00241
                                            382/118
2013/0278724 A1*  10/2013  Namgoong ............ G06F 21/31
                                            348/46
(Continued)

*Primary Examiner* — Yon J Couso
(74) *Attorney, Agent, or Firm* — Nixon Peabody LLP

(57) ABSTRACT

Embodiments of the present disclosure disclose a method and apparatus for recognizing a face. A specific embodiment of the method includes: acquiring at least two facial images of a to-be-recognized face under different illuminations using a near-infrared photographing device; generating at least one difference image based on a brightness difference between each two of the at least two facial images; determining a facial contour image of the to-be-recognized, face based on the at least one difference image; inputting the at least two facial images, the at least one difference image, and the facial contour image into a pre-trained real face prediction value calculation model to obtain a real face prediction value of the to-be-recognized face; and outputting prompt information for indicating successful recognition of a real face, in response to determining the obtained real face prediction value being greater than a preset threshold.

15 Claims, 5 Drawing Sheets

(51) Int. Cl.
  *G06K 9/62* (2006.01)
  *G06T 7/174* (2017.01)
  *G06K 9/20* (2006.01)
  *G06K 9/48* (2006.01)
  *G06K 9/46* (2006.01)
  *H04N 5/33* (2006.01)

(52) U.S. Cl.
  CPC .............. *G06K 9/6288* (2013.01); *G06T 7/13* (2017.01); *G06T 7/174* (2017.01); *G06T 2207/10048* (2013.01); *G06T 2207/10152* (2013.01); *G06T 2207/20081* (2013.01); *G06T 2207/20084* (2013.01); *G06T 2207/30201* (2013.01); *H04N 5/33* (2013.01)

(58) Field of Classification Search
  CPC . G06T 2207/20081; G06T 2207/30201; G06T 7/12; H04N 5/33
  See application file for complete search history.

(56) References Cited

U.S. PATENT DOCUMENTS

2016/0350582 A1* 12/2016 Ueda .................... G06F 16/583
2019/0122061 A1*  4/2019 Li ........................ H04N 5/2256
2019/0228211 A1*  7/2019 Chen .................. G06K 9/00228

* cited by examiner

METHOD AND APPARATUS FOR RECOGNIZING FACE

CROSS-REFERENCE TO RELATED APPLICATIONS

This application is related to and claims priority from Chinese Application No. 201711195454.9, filed on Nov. 24, 2017 and entitled "Method and Apparatus for Recognizing Face," the entire disclosure of which is hereby incorporated by reference.

TECHNICAL FIELD

Embodiments of the present disclosure relate to the field of computer technology, specifically relate to the field of Internet technology, and more specifically relate to a method and apparatus for recognizing a face.

BACKGROUND

Facial recognition is a biometric technology for identification based on facial feature information. A series of related technologies for capturing an image or a video stream containing a face by a camera, automatically detecting and tracking the face in the image, and then performing recognition on the detected face, are usually referred to as facial recognition.

The existing facial recognition method usually determines the identity of a to-be-recognized face for subsequent actions after analyzing and processing the acquired face image.

SUMMARY

Embodiments of the present disclosure propose a method and apparatus for recognizing a face.

In a first aspect, embodiments of the present disclosure provide a method for recognizing a face. The method includes: acquiring at least two facial images of a to-be-recognized face under different illuminations using a near-infrared photographing device; generating at least one difference image based on a brightness difference between each two of the at least two facial images; determining a facial contour image of the to-be-recognized face based on the at least one difference image; inputting the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and outputting prompt information for indicating successful recognition of a real face, in response to determining the obtained real face prediction value being greater than a preset threshold.

In some embodiments, the near-infrared photographing device includes an illumination lamp; and the acquiring at least two facial images of a to-be-recognized face under different illuminations using a near-infrared photographing device, includes: acquiring respectively a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face.

In some embodiments, the generating at least one difference image based on a brightness difference between each two of the at least two facial images, includes: generating a first difference image based on a brightness difference between the first facial image and the second facial image, and generating a second difference image based on a difference between the first facial image and the third facial image.

In some embodiments, the determining a facial contour image of the to-be-recognized face based on the at least one difference image, includes: determining a maximum pixel value in the first difference image and the second difference image; determining respectively a ratio of the first difference image to the maximum pixel value and a ratio of the second difference image to the maximum pixel value, to obtain a first ratio image and a second ratio image; and marking a position of a brightness change in the first ratio image and a position of a brightness change in the second ratio image, and defining the marked first ratio image and the marked second ratio image as the facial contour image.

In some embodiments, the real face prediction value calculation model includes a convolutional neural network, and the convolutional neural network includes a convolutional layer and a fully connected layer.

In some embodiments, the inputting the at least two facial images, the at least one difference image, and the facial contour image into a pre-trained real face prediction value calculation model to obtain a real face prediction value of the to-be-recognized face, includes: inputting the at least two facial images, the at least one difference image, and the facial contour image into the convolution layer to obtain a fusion feature vector of the at least two facial images, the at least one difference image, and the facial contour image, represent a corresponding relationship between the facial images, the difference image, the facial contour image and the fusion feature vector; and inputting the obtained fusion feature vector into the fully connected layer to obtain the real face prediction value of the to-be-recognized face, wherein the fully connected layer is used to represent a corresponding relationship between the fusion feature vector and the real face prediction value.

In some embodiments, the real face prediction value calculation model is obtained by training by: acquiring an initial real face prediction value calculation model; acquiring a plurality of real face image samples and a plurality of non-real face image samples captured by the near-infrared device as a sample set, wherein the real face image samples include near-infrared facial image samples, brightness difference image samples and brightness difference based facial contour samples of a real face captured under different near-infrared illumination, and the non-real face image samples include near-infrared facial image samples, brightness difference image samples and brightness difference based facial contour samples of a real face image captured under different near-infrared illumination; and training the initial real face prediction value calculation model to obtain the real face prediction value calculation model using each sample in the sample set as input data, and using a manually annotated numerical sample corresponding to each sample as corresponding output data.

In a second aspect, embodiments of the present disclosure provide an apparatus for recognizing a face. The apparatus includes: an acquisition unit, configured to acquire at least two facial images of a to-be-recognized face under different illuminations using a near-infrared photographing device; a generation unit, configured to generate at least one difference image based on a brightness difference between each two of the at least two facial images; a determination unit, configured to determine a facial contour image of the to-be-recognized face based on the at least one difference image; a real face prediction value calculation unit, configured to input the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and an output unit, configured to output prompt information for indicating successful recognition of a real face, in response to determining the obtained real face prediction value being greater than a preset threshold.

In some embodiments, the near-infrared photographing device includes an illumination lamp; and the acquisition unit is further configured to: acquire respectively a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face.

In some embodiments, the generation unit is further configured to: generate a first difference image based on a brightness difference between the first facial image and the second facial image, and generate a second difference image based on a difference between the first facial image and the third facial image.

In some embodiments, the determination unit is further configured to: determine a maximum pixel value in the first difference image and the second difference image; determine respectively a ratio of the first difference image to the maximum pixel value and a ratio of the second difference image to the maximum pixel value, to obtain a first ratio image and a second ratio image; and mark a position of a brightness change in the first ratio image and a position of a brightness chance in the second ratio image, and define the marked first ratio image and the marked second ratio image as the facial contour image.

In some embodiments, the real face prediction value calculation model includes a convolutional neural network, and the convolutional neural network includes a convolutional layer and a fully connected layer.

In some embodiments, the real face prediction value calculation unit is further configured to: input the at least two facial images, the at least one difference image, and the facial contour image into the convolution layer to obtain a fusion feature vector of the at least two facial images, the at least one difference image, and the facial contour image, wherein the convolution layer is used to represent a corresponding relationship between the facial images, the n difference image, the facial contour image and the fusion feature vector; and input the obtained fusion feature vector into the fully connected layer to obtain the real face prediction value of the to-be-recognized face, wherein the fully connected layer is used to represent a corresponding relationship between the fusion feature vector and the real face prediction value.

In some embodiments, the apparatus further includes a real face prediction value calculation model generation unit, and the generation unit includes: a first acquisition subunit, configured to acquire an initial real face prediction value calculation model; a second acquisition subunit, configured to acquire a plurality of real face image samples and a plurality of non-real face image samples captured by the near-infrared device as a sample set, wherein the real face image samples include near-infrared facial image samples, brightness difference image samples and brightness difference based facial contour samples of a real face captured under different near-infrared illumination, and the non-real face image samples include near-infrared image samples, brightness difference image samples and brightness difference based facial contour samples of a real face image captured under different near-infrared illumination; and a training subunit, configured to train the initial real face prediction value calculation model to obtain the real face prediction value calculation model using each sample in the sample set as input data, and using a manually annotated numerical sample corresponding to each sample as corresponding output data.

The method and apparatus for recognizing a face provided by the embodiments of the present disclosure acquire facial images of a to-be-recognized face under different illuminations using a near-infrared photographing device, determine a facial contour image of the to-be-recognized face based on brightness difference between different images, input the obtained facial images, the difference image, and the facial contour image of the to-be-recognized face into a pre-trained real face prediction value calculation model to obtain a real face prediction value, thereby recognizing a real face by effectively utilizing a material attribute characteristic where the images captured by the near-infrared device are different for reflections of different materials, a shadow difference feature in the brightness difference image, and a deep facial contour feature obtained based on the shadow difference, thus improving the recognition accuracy.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
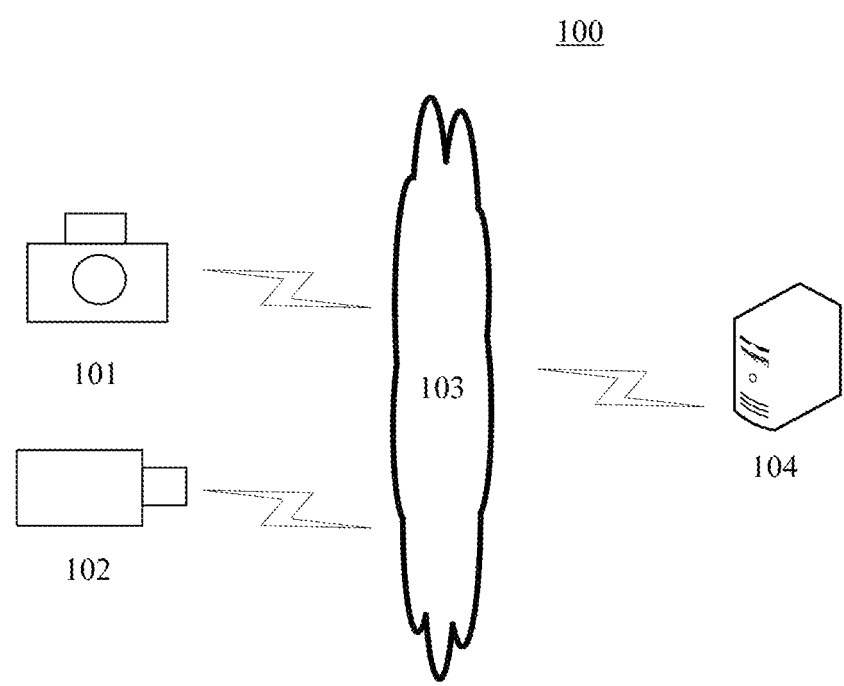
FIG. 1 is an architecture diagram of an exemplary system in which the present disclosure may be implemented.

FIG. 1 shows an architecture of an exemplary system 100 which may be used by a method for recognizing a face or an apparatus for recognizing a face according to the embodiments of the present disclosure.

As shown in FIG. 1, the system architecture 100 may include near-infrared photographing devices 101 and 102, a network 103, and a server 104. The network 103 serves as a medium providing a communication link between the near-infrared photographing devices 101 and 102, and the server 104. The network 103 may include various types of connections, such as wired or wireless transmission links, or optical fibers.

The near-infrared photographing devices 101 and 102 interact with the server 104 through the network 103, and provide captured facial images of a to-be-recognized face to the server 104. The near-infrared photographing devices 101 and 102 may be near-infrared cameras or video cameras.

The server 104 may be a server providing various services, such as a backend server that analyzes and processes near-infrared images captured by the near-infrared devices 101, 102.

It should be noted that the method for recognizing a face provided by the embodiments of the present disclosure is generally performed by the server 104. Accordingly, the apparatus for recognizing a face is generally provided in the server 104.

It should be understood that the numbers of the near-infrared photographing devices, the networks and the servers in FIG. 1 are merely illustrative. Any number of near-infrared photographing devices, networks and servers may be provided based on the actual requirements. The near-infrared photographing device in FIG. 1 may also be directly installed in the above server. The near-infrared photographing device may save a captured image locally, and the server direct acquires the image locally, thus, there is no need to set up a network between the near-infrared photographing device and the server.

Figure 2:
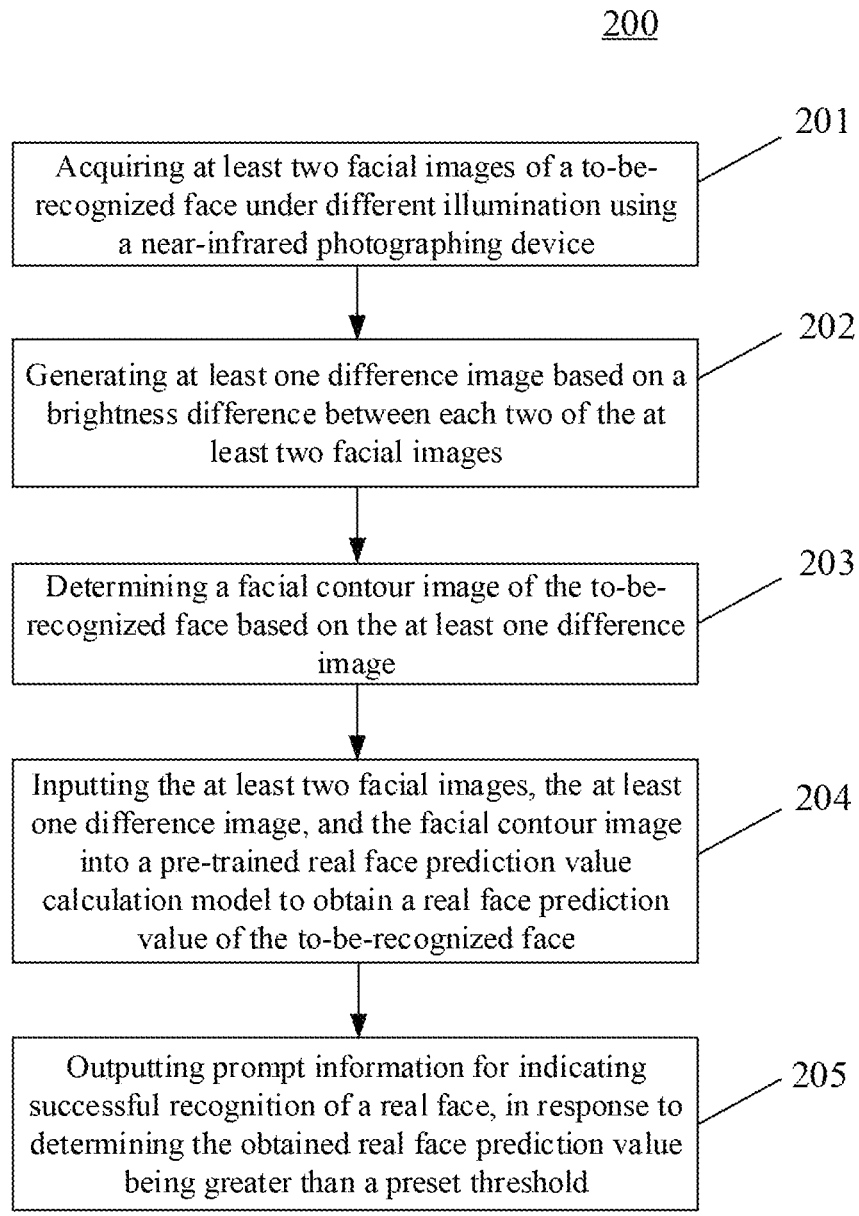
FIG. 2 is a flowchart of an embodiment of a method for recognizing a face according to the present disclosure.

With further reference to FIG. 2, a flow 200 of an embodiment of the method for recognizing a face according to the present disclosure is illustrated. The method for recognizing a face includes the following steps.

Step 201, acquiring at least two facial images of a to-be-recognized face under different illuminations using a near-infrared photographing device.

In the present embodiment, the electronic device (e.g., the server as shown in FIG. 1) on which the method for recognizing a face is performed may acquire facial images of a to-be-recognized face from a near-infrared photographing device through a wired connection or a wireless connection. When the near-infrared photographing device is directly installed in the server, the near-infrared photographing device may save a captured image locally, and the server directly acquires the image locally. Here, near-infrared light is an electromagnetic wave between visible light and mid-infrared light, and has a wavelength ranging from 780 nm to 2526 nm, as defined by ASTM (American Society for Testing and Materials). Here, the near-infrared photographing device may be a camera, a video camera. The near-infrared photographing device may be a CCD (Charge-coupled Device) photographing device covering a near-infrared light wave band, and a near-infrared filter is added between the CCD and the lens assembly. Here, the image captured by the near-infrared photographing device may be an image having a single channel color (for example, an R channel), or an image having multi-channel colors (for example, L, a, b channels). Here, the facial image may be a photo or a video.

In the present embodiment, a patch near-infrared light-emitting tube and an adjustable resistor may be disposed in the near-infrared photographing device, and the electronic device may change the brightness of the captured image by changing the resistance of the adjustable resistor, thereby acquiring facial images of a to-be-recognized face under different illumination, thereby obtaining facial images of the to-be-recognized face in different brightness. Here, at least two images of the to-be-recognized face may be acquired. For example, a facial image with no extra light (i.e., under natural light), and a facial image with extra light may be acquired.

Step 202, generating at least one difference image based on a brightness difference between each two of the at least two facial images.

In the present embodiment, since a real face is three-dimensional, different positions of the face may generate different brightness during image capturing, in particular, the difference between the brightness of a shadow projected by a convex portion such as the nose and the brightness of other positions is great. When changing the illumination condition to shoot the face again using the near-infrared device, the brightness of various portions of the face does not increase evenly and proportionally, but produces different degrees of brightness difference. For a non-real face, such as a photo, or a video corresponding to a real face, when the near-infrared photographing device performs image capturing on the photo or the video under different illuminations conditions, the brightness of the photo or the video may increase proportionally.

In the present embodiment, based on the at least two facial images under different illuminations acquired in step 201, this step may perform brightness difference comparison on each of the two of the at least two facial images, and generate at least one difference image based on a comparison result.

By determining the brightness difference between each two facial images, it is possible to roughly distinguish whether the to-be-recognized face is a real face or a non-real face.

Step 203, determining a facial contour image of the to-be-recognized face based on the at least one difference image.

In the present embodiment, based on the at least one difference image determined in step 202, the electronic device may determine a facial contour image of the to-be-recognized face. Here, the facial contour may be a nose contour, a face contour, or an eye contour.

In the present embodiment, the electronic device may perform contour annotating on the nose, the face, or the eye in each of the at least one difference image, and define the annotated image as the facial contour image of the to-be-recognized face.

Step 204, inputting the at least two facial images, the at least one difference image, and the facial contour image into a pre-trained real face prediction value calculation model to obtain a real face prediction value of the to-be-recognized face.

In the present embodiment, based on the at least two facial images acquired in step 201, the at least one difference image generated in step 202 and the facial contour image determined in step 203, the electronic device may input the at least two facial images, the at least one difference image, and the facial contour image into a pre-trained real face prediction value calculation model to obtain a real face prediction value of the to-be-recognized face.

In the present embodiment, the real face prediction value calculation model may represent a corresponding relationship between the at least two facial images, the at least one difference image, the facial contour image and the real face prediction value. The electronic device may train the real face prediction value calculation model that may represent a corresponding relationship between the at least two facial images, the at least one difference image, the facial contour image and the real face prediction value using various methods. The at least two facial images may be two facial images, three facial images, and the like. The at least one difference image may be one difference image, two difference images, and the like. The real face prediction value calculation model may normalize the plurality of facial images, or normalize the plurality of difference images.

As an example, the electronic device stores a corresponding relationship table including a plurality of corresponding relationships between at least two facial images, at least one difference image, a facial contour image and a real face prediction value of a to-be-recognized face based on a real face and a non-real face, and defines the corresponding relationship table as the real face prediction value calculation model. In this way, the electronic device may compare the at least two facial images, the at least one difference image, and the facial contour image of the to-be-recognized face respectively with the at least two facial images, the at least one difference image, and the facial contour image based on the real face and non-real face in the corresponding relationship table. If two of the at least two facial images, the at least one difference image, and the facial contour image of the to-be-recognized face are same or similar with two of the at least two facial images, the at least one difference image and the facial contour image of the real face or the non-real face in the corresponding relationship table, the real face prediction value corresponding to the real face or the non-real face in the corresponding relationship table is defined as the real face prediction value of the to-be-recognized face.

As another example, the real face prediction value calculation model may also be obtained by training through the following steps: the electronic device may first acquire an initial real face prediction value calculation model. The initial real face prediction value calculation model may be an untrained real face prediction value calculation model or a real face prediction value calculation model having not finished training. For example, the initial real face prediction value calculation model may be an untrained neural network (e.g., a convolutional neural network, a recurrent neural network). The neural network abstracts the human brain neural network from the perspective of information processing, establishes a simple model, and forms different networks according to different connections. The neural network is usually composed of a large number of nodes (or neurons) connected with each other, each node representing a specific output function, which is referred to as the activation function. The connection between every two nodes represents a weighting value for a signal passing the connection, referred to as a weight (also referred to as a parameter), and the output of the network is different depending on the connection, weight value and activation function of the network. A deep learning model usually includes a plurality of layers, each layer including a plurality of nodes. Generally, the weights of the nodes of the same layer may be the same, the weights of the nodes of different layers may be different, and the parameters of the plurality of layers of the initial real face prediction value calculation model may also be different. The layers of the initial real face prediction value calculation model may be provided with initial parameters. Then, the electronic device acquires a plurality of real face image samples and a plurality of non-real face image samples captured by the near-infrared device as a sample set. Here, the real face image samples include near-infrared facial image samples, brightness difference image samples and brightness difference based facial contour samples of a real face captured under different near-infrared illumination, and the non-real face image samples include near-infrared facial image samples, brightness difference image samples and brightness difference based facial contour samples of a real face image captured under different near-infrared illumination. Finally, the parameters of the plurality of layers of the initial real face prediction value calculation model may be trained to obtain the real face prediction value calculation model using each sample in the sample set as input data, and using a manually annotated numerical sample corresponding to the each sample as corresponding output data.

Step 205, outputting prompt information for indicating successful recognition of a real face, in response to determining the obtained real face prediction value being greater than a preset threshold.

In the present embodiment, a preset threshold is preset in the electronic device, and when the real face prediction value is greater than the preset threshold, the to-be-recognized face may be determined to be a real face; when the real face prediction value is less than the preset threshold, the to-be-recognized face may be determined to be a non-real face. Based on the real face prediction value determined in step 204, this step may output prompt information for indicating successful recognition of a real face, in response to determining the obtained real face prediction value being greater than the preset threshold.

Figure 3:
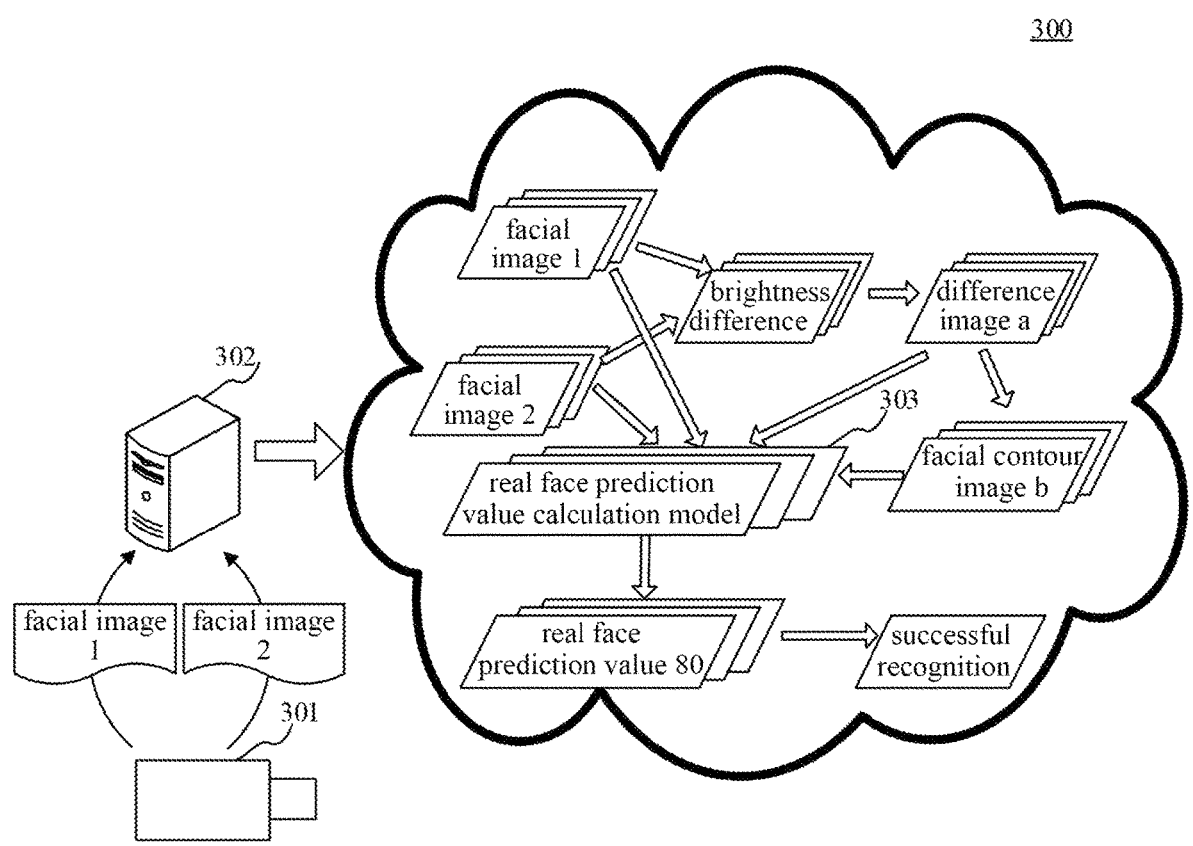
FIG. 3 is a schematic diagram of an application scenario of the method for recognizing a face according to the present disclosure.

With further reference to FIG. 3, a schematic diagram of an application scenario of the method for recognizing a face according to the present embodiment is illustrated. In the application scenario of FIG. 3, the server 302 first acquires "facial image 1" and "facial image 2" of the to-be-recognized face captured by the near-infrared photographing device 301. Here, the brightness of "facial image 1" and "facial image 2" are different, and other conditions are the same. Next, the server 302 obtains brightness difference based "difference image a" based on the brightness difference between "facial image 1" and "facial image 2", and at the same time obtains "facial contour image b" of the to-be-recognized face based on "difference image a". Then, the server 302 inputs "facial image 1", "facial image 2", "difference image a" and "facial contour image b" into the pre-trained real face prediction value calculation model 304 to obtain a real face prediction value "80" of the to-be-recognized face. The real face prediction value calculation model 304 is used to represent a corresponding relationship between "facial image 1", "facial image 2", "difference image a", "facial contour image b" and the real face prediction value "80". Finally, the server 302 compares the real face prediction value "80" with a preset threshold, for example, the preset threshold is 60. Since 80 is greater than 60, the prompt information for indicating successful recognition of the real face is outputted.

The method and apparatus for recognizing a face provided by the embodiments of the present disclosure acquire facial images of a to-be-recognized face under different illuminations using a near-infrared photographing device, determine a facial contour image of the to-be-recognized face based on brightness difference between different images, input the obtained facial images, the difference image, and the facial contour image of the to-be-recognized face into a pre-trained real face prediction value calculation model to obtain a real face prediction value, thereby recognizing a real face by effectively utilizing a material attribute characteristic where the images captured by the near-infrared device are different for reflections of different materials, a shadow difference feature in the brightness difference image, and a deep facial contour feature obtained based on the shadow difference, thus improving the recognition accuracy.

Figure 4:
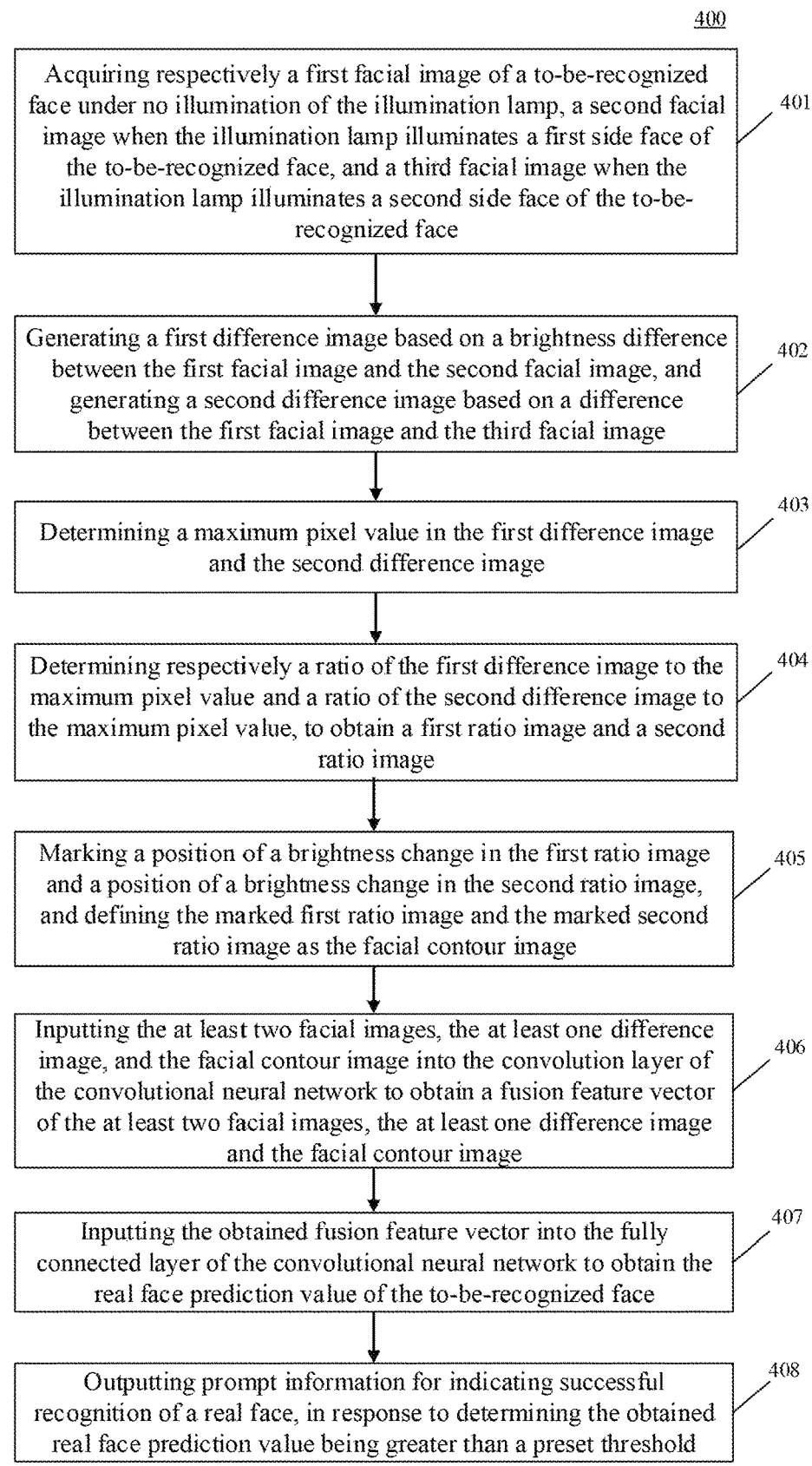
FIG. 4 is a flowchart of another embodiment of the method for recognizing a face according to the present disclosure.

With further reference to FIG. 4, a flow 400 of another embodiment of the method for recognizing a face is illustrated. The flow 400 of the method for recognizing a face includes the following steps.

Step 401, acquiring respectively a first facial image of a to-be-recognized face under no illumination of the illumination lamp, a second facial image when the illumination lamp illuminates a first side of the to-be-recognized face, and a third facial image when the illumination lamp illuminates a second side of the to-be-recognized face.

In the present embodiment, the electronic device (e.g., the server as shown in FIG. 1) on which the method for recognizing a face is performed may acquire facial images of a to-be-recognized face from a near-infrared photographing device through a wired connection or a wireless connection. When the near-infrared photographing device is directly installed in the server, the near-infrared photographing device may save a captured image locally, and the server directly acquires the image locally.

In the present embodiment, the near-infrared photographing device further includes an illumination lamp. Here, the illumination lamp may be either an LED light or a near-infrared light. The illumination lamp may be one, or two. When there are two illumination lamps, the two lamps are respectively disposed on both sides of the near infrared photographing device. The electronic device respectively acquires a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face. Here, the first side may be a left side viewed from the infrared photographing device when facing the infrared photographing device, and the second side may be a right side viewed from the infrared photographing device when facing the infrared photographing device. The first side and the second side are different sides. By setting the facial images under different illuminations and the facial images of different illuminations positions under the same illumination, shadows in different images may be better formed, thereby improving the accuracy of a subsequent recognition result.

In a preferred implementation of the present embodiment, the illumination lamp is a near-infrared lamp. By setting the illumination lamp to be a near-infrared lamp, the discomfort of eyes to the flashlight may be reduced, thereby improving the user experience.

Step 402, generating a first difference image based on a brightness difference between the first facial image and the second facial image, and generating a second difference image based on a difference between the first facial image and the third facial image.

Based on the first facial image, the second facial image and the third facial image determined in step 401, the electronic device may compare the brightness differences between respective areas between the first facial image and the second facial image, and generate a first difference image based on the comparison result. At the same time, the electronic device may compare the brightness differences between respective areas between the first facial image and the third facial image, and generate a second difference image based on the comparison result. In this way, when the to-be-recognized face is a real face, the first difference image is an image in which the brightness of the first side is high and the brightness of the second side is low, and the second difference image is an image in which the brightness of the second side is high and the brightness of the first side is low.

Step 403, determining a maximum pixel value in the first difference image and the second difference image.

In the present embodiment, based on the first difference image and the second difference image determined in step 402, the electronic device may determine a maximum pixel value in the first difference image and the second difference image.

Step 404, determining respectively a ratio of the first difference image to the maximum pixel value and a ratio of the second difference image to the maximum pixel value, to obtain a first ratio image and a second ratio image.

In the present embodiment, the electronic device determines a ratio of each pixel value in the first difference image to the maximum pixel value, and obtains a first ratio image based on the ratio result of each pixel. The electronic device may also determine a ratio of each pixel value in the second difference image to the maximum pixel value, and obtains a second ratio image based on the ratio result of each pixel.

Step 405, marking a position of a brightness change in the first ratio image and a position of a brightness change in the second ratio image, and defining the marked first ratio image and the marked second ratio image as the facial contour image.

In the present embodiment, based on the first ratio image and the second ratio image determined in step 404, the first ratio image and the second ratio image each has a position of significant brightness change, that is, a position at which the brightness in each ratio image is changed from bright to dark. The electronic device may mark the position of the brightness change while defining the marked first ratio image and the marked second ratio image as the facial contour image.

Step 406, inputting the at least two facial images, the at least one difference image, and the facial contour image into the convolution layer of the convolutional neural network to obtain a fusion feature vector of the at least two facial images, the at least one difference image and the facial contour image.

In the present embodiment, based on the first facial image, the second facial image, and the third facial image acquired in step 401, the first difference image, the second difference image acquired in step 402, and the facial contour image acquired in step 405, the electronic device may input the first facial image, the second facial image, the third facial image, the first difference image, the second difference image, and the facial contour image into the convolution layer of the convolutional neural network, thereby obtaining a fusion vector of the first facial image, the second facial image, the third facial image, the first difference image, the second difference image, and the facial contour image. Here, the fusion vector is fused based on feature components of the facial images, the difference images, and the facial contour image. The feature components are used to describe features of the facial images, the difference images, and the facial contour image. Here, since the facial images are captured by the near-infrared photographing device, and the near-infrared device may determine a material attribute of the to-be-recognized face, such as a human skin, a paper photograph, by acquiring reflection characteristics of different materials, the feature of the facial image may be a material attribute feature, and the feature of the facial contour image may be a facial contour feature, such as nose contour feature.

In the present embodiment, the convolutional neural network may be a feedforward neural network, and the artificial neurons of the convolutional neural network may respond to a part of surrounding cells within the coverage range. Thus, the convolutional neural network has excellent performance in large image processing. Typically, the convolutional neural network includes a plurality of convolutional layers, the basic structure of each convolutional layer includes two layers. One of the two layers is a feature extraction layer, the input of each neuron is connected to a locally accepted domain of the previous layer, and the local feature is extracted. Once the local feature is extracted, the positional relationship between the local feature and other features is also determined. The other of the two layers is a feature mapping layer, each computing layer of the network is composed of a plurality of feature mappings, each feature mapping is a plane, and all neurons in the plane have equal weights. Here, the electronic device may input the first facial image, the second facial image, the third facial image, the first difference image, the second difference image, and the facial contour image into an input side of the convolution layer of the convolutional neural network. The images are sequentially processed by the parameters of the convolution layers and outputted from an output side of the convolutional layer, and the information outputted by the output side is the fusion feature vector.

In the present embodiment, the convolution layer of the convolutional neural network is used to represent a corresponding relationship between a facial image, a difference image, a facial contour image and a fusion feature vector. The electronic device may train the convolution layer that may represent a corresponding relationship between the facial image, the difference image, the facial contour image and the fusion feature vector by the following approach.

The electronic device may first acquire a sample set including real face image samples and non-real face image samples, and a fusion feature vector set including fusion feature vectors of the real face image samples and fusion feature vectors of the non-real face image samples. Each sample in the sample set corresponds to a fusion feature vector in the fusion feature vector set. Then, the samples in the sample set are used as the input, and the fusion feature vectors corresponding to the samples in the sample set are used as the output, and a convolution layer capable of representing the corresponding relationship between the facial image, the difference image, the facial contour image and the fusion feature vector is obtained by training.

Step 407, inputting the obtained fusion feature vector into the fully connected layer of the convolutional neural network to obtain the real face prediction value of the to-be-recognized face.

In the present embodiment, based on the fusion feature vector obtained in step 406, the electronic device may input the fusion feature vector into the fully connected layer of the convolutional neural network to obtain the real face prediction value of the to-be-recognized face.

In the present embodiment, each node of the fully connected layer is connected to all nodes of the output end of the convolutional layer for synthesizing the feature vectors of the video outputted from the output end of the convolutional layer. Due to the fully connected nature of the fully connected layer, usually the parameters of the fully connected layer are the most. At the same time, after performing a linear transformation on the fusion feature vector using the parameters of the fully connected layer, a nonlinear activation function may be added to transform the result of the linear transformation, thereby introducing a nonlinear factor to enhance the expression ability of the deep learning model. The activation function may be a sigma function, and the sigma function is commonly used in artificial neural networks, detailed description thereof will be omitted.

In the present embodiment, the fully connected layer may be used to represent a corresponding relationship between the fusion feature vector and the real face prediction value. The electronic device may train the fully connected layer that may represent the corresponding relationship between the fusion feature vector and the real face prediction value by the following approach.

The electronic device may first acquire the fusion feature vector of each sample in the sample set, and annotate a value for each fusion feature vector. Then, the fully connected layer capable of representing the corresponding relationship between the fusion feature vector and the real face prediction value is obtained by training using the fusion feature vectors of the samples in the sample set as the input, the annotated values corresponding to the fusion feature vectors as the output.

Step 408, outputting prompt information for indicating successful recognition of a real face, in response to determining the obtained real face prediction value being greater than a preset threshold.

In the present embodiment, a preset threshold is preset in the electronic device, and when the real face prediction value is greater than the preset threshold, the to-be-recognized face may be determined to be a real face. When the real face prediction value is less than the preset threshold, the to-be-recognized face may be determined to be a non-real face. Based on the real face prediction value determined in step 407, this step may output prompt information for indicating successful recognition of a real face, in response to determining the obtained real face prediction value being greater than the preset threshold.

As may be seen from FIG. 4, the flow 400 of the method for recognizing a face in the present embodiment highlights the number of facial images, the structure of the real face prediction value calculation model and the working principle of each structure, as compared with the embodiment corresponding to FIG. 2. Thus, the solution described in the present embodiment can improve the accuracy of the contour feature of the to-be-recognized face and the accuracy of the model, thereby further improving the accuracy of the prediction value of the to-be-recognized face.

Figure 5:
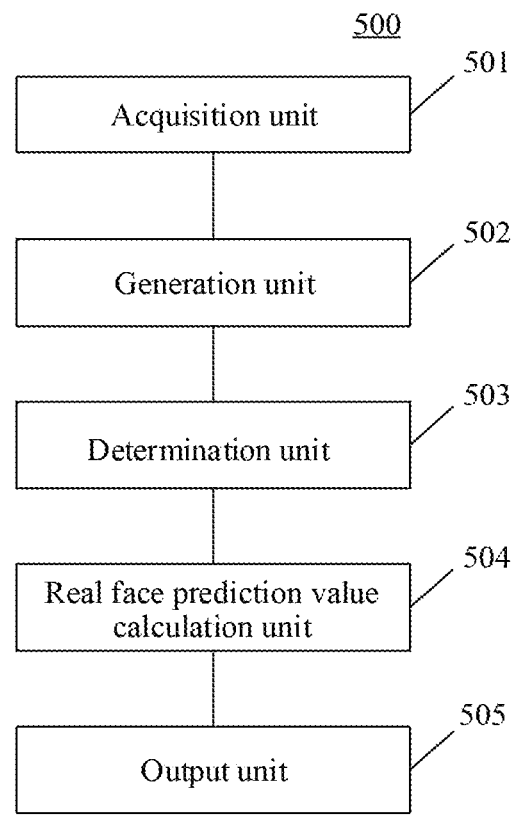
FIG. 5 is a schematic structural diagram of an embodiment of an apparatus for recognizing a face according to the present disclosure.

With further reference to FIG. 5, as an implementation to the method shown in the above figures, the present disclosure provides an embodiment of an apparatus for recognizing a face. The apparatus embodiment corresponds to the method embodiment shown in FIG. 2, and the apparatus may specifically be applied to various electronic devices.

As shown in FIG. 5, the apparatus 500 for recognizing a face of the present embodiment includes: an acquisition unit 501, a generation unit 502, a determination unit 503, a real face prediction value calculation unit 504 and an output unit 505. The acquisition unit 501 is configured to acquire at least two facial images of a to-be-recognized face under different illuminations using a near-infrared photographing device. The generation unit 502 is configured to generate at least one difference image based on a brightness difference between each two of the at least two facial images. The determination unit 503 is configured to determine a facial contour image of the to-be-recognized face based on the at least one difference image. The real face prediction value calculation unit 504 is configured to input the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real-face prediction value. The output unit 505 is configured to output prompt information for indicating successful recognition of a real face, in response to determining the obtained real face prediction value being greater than a preset threshold.

In the present embodiment, in the apparatus 500 for recognizing a face, the specific processing of the acquisition unit 501, the generation unit 502, the determination unit 503, the real face prediction value calculation unit 504 and the output unit 505 and the technical effects thereof may be respectively referred to the related descriptions of step 201, step 202, step 203, step 204 and step 205 in the corresponding embodiment of FIG. 2, and detailed description thereof will be omitted.

In some alternative implementations of the present embodiment, the near-infrared photographing device includes an illumination lamp; and the acquisition unit is further configured to: acquire respectively a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face.

In some alternative implementations of the present embodiment, the generation unit is further configured to: generate a first difference image based on a brightness difference between the first facial image and the second facial image, and generate a second difference image based on a difference between the first facial image and the third facial image.

In some alternative implementations of the present embodiment, the determination unit is further configured to: determine a maximum pixel value in the first difference image and the second difference image; determine respectively a ratio of the first difference image to the maximum pixel value and a ratio of the second difference image to the maximum pixel value, to obtain a first ratio image and a second ratio image; and mark a position of a brightness change in the first ratio image and a position of a brightness change in the second ratio image, and define the marked first ratio image and the marked second ratio image as the facial contour image.

In some alternative implementations of the present embodiment, the real face prediction value calculation model includes a convolutional neural network, and the convolutional neural network includes a convolutional layer and a fully connected layer.

In some alternative implementations of the present embodiment, the real face prediction value calculation unit is further configured to: input the at least two facial images, the at least one difference image, and the facial contour image into the convolution layer to obtain a fusion feature vector of the at least two facial images, the at least one difference image, and the facial contour image, wherein the convolution layer is used to represent a corresponding relationship between the facial images, the difference image, the facial contour image and the fusion feature vector; and input the obtained fusion feature vector into the fully connected layer to obtain the real face prediction value of the to-be-recognized face, wherein the fully connected layer is used to represent a corresponding relationship between the fusion feature vector and the real face prediction value.

In some alternative implementations of the present embodiment, the apparatus further includes a real face prediction value calculation model generation unit (not shown), and the real face prediction value calculation model generation unit includes: a first acquisition subunit (not shown), configured to acquire an initial real face prediction value calculation model; a second acquisition subunit (not shown), configured to acquire a plurality of real face image samples and a plurality of non-real face image samples captured by the near-infrared device as a sample set, wherein the real face image samples include near-infrared facial image samples, brightness difference image samples and brightness difference based facial contour samples of a real face captured under different near-infrared illumination, and the non-real face image samples include near-infrared facial image samples, brightness difference image samples and brightness difference based facial contour samples of a real face image taken under different near-infrared illumination; and a training subunit (not shown), configured to train the initial real face prediction value calculation model to obtain the real face prediction value calculation model using each sample in the sample set as input data, and using a manually annotated numerical sample corresponding to each sample as corresponding output data.

Figure 6:
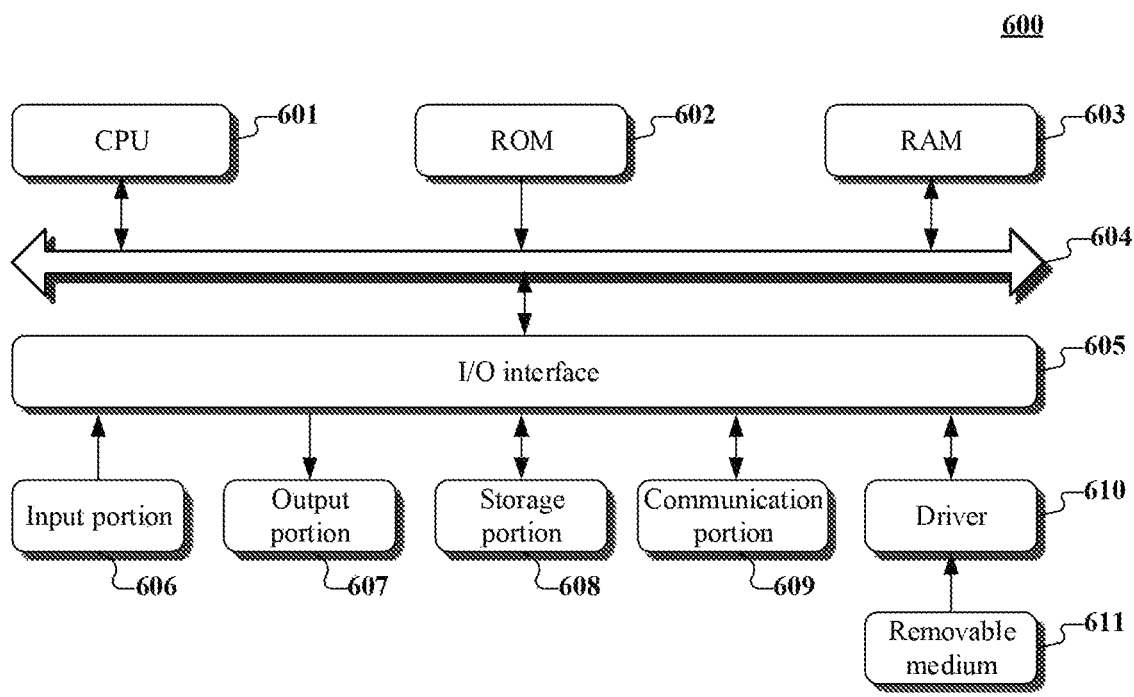
FIG. 6 is a schematic structural diagram of a computer system adapted to implement a terminal device or a server of embodiments of the present disclosure.

Referring to FIG. 6, a schematic structural diagram of a computer system 600 adapted to implement an electronic device of the embodiments of the present disclosure is shown. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

One or more programming languages or combinations can be used to write computer program codes for performing operations of the present disclosure. The programming languages include object-oriented programming languages such as Java, Smalltalk and C++, and include conventional procedural programming languages such as "C" or similar programming languages. Program codes can be completely executed on a user computer, partially executed on the user computer, executed as an independent package, partially executed on the user computer and partially executed on a remote computer, or completely executed on the remote computer or a server. In the case where the remote computer is involved, the remote computer can be connected to the user computer through any kind of network, including a local area network (LAN) or a wide area network (WAN), or can be connected to an external computer (for example, using Internet service providers to connect through the Internet).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquisition unit, a generation unit, a determination unit, a real face prediction value calculation unit, and an output unit, where the names of these units do not in some cases constitute a limitation to such units themselves. For example, the acquisition unit may also be described as "a unit for acquiring at least two facial images of a to-be-recognized face under different illuminations using a near-infrared photographing device."

In another aspect, the present disclosure further provides a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by an electronic device, cause the electronic device to: acquiring at least two facial images of a to-be-recognized face under different illuminations using a near-infrared photographing device; generating at least one difference image based on a brightness difference between each two of the at least two facial images; determining a facial contour image of the to-be-recognized face based on the at least one difference image; inputting the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and outputting prompt information for indicating successful recognition of a real face, in response to determining the obtained real face prediction value being greater than a preset threshold.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a face, the method comprising:
    acquiring at least two facial images of a to-be-recognized face under different illuminations using a near-infrared photographing device;
    generating at least one difference image based on a brightness difference between each two of the at least two facial images;
    determining a facial contour image of the to-be-recognized face based on the at least one difference image;
    inputting the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and
    outputting prompt information for indicating successful recognition of a real face, in response to determining the obtained real face prediction value being greater than a preset threshold.

2. The method according to claim 1, wherein the near-infrared photographing device comprises an illumination lamp; and
    the acquiring at least two facial images of a to-be-recognized face under different illuminations using a near-infrared photographing device, comprises:
    acquiring respectively a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face.

3. The method according to claim 2, wherein the generating at least one difference image based on a brightness difference between each two of the at least two facial images, comprises:
    generating a first difference image based on a brightness difference between the first facial image and the second facial image, and generating a second difference image based on a difference between the first facial image and the third facial image.

4. The method according to claim 3, wherein the determining a facial contour image of the to-be-recognized face based on the at least one difference image, comprises:
    determining a maximum pixel value in the first difference image and the second difference image;
    determining respectively a ratio of the first difference image to the maximum pixel value and a ratio of the second difference image to the maximum pixel value, to obtain a first ratio image and a second ratio image; and
    marking a position of a brightness change in the first ratio image and a position of a brightness change in the second ratio image, and defining the marked first ratio image and the marked second ratio image as the facial contour image.

5. The method according to claim 1, wherein the real face prediction value calculation model comprises a convolutional neural network, and the convolutional neural network comprises a convolutional layer and a fully connected layer.

6. The method according to claim 5, wherein the inputting the at least two facial images, the at least one difference image, and the facial contour image into a pre-trained real face prediction value calculation model to obtain a real face prediction value of the to-be-recognized face, comprises:
    inputting the at least two facial images, the at least one difference image, and the facial contour image into the convolution layer to obtain a fusion feature vector of the at least two facial images, the at least one difference image, and the facial contour image, wherein the convolution layer is used to represent a corresponding relationship between the facial images, the difference image, the facial contour image and the fusion feature vector; and
    inputting the obtained fusion feature vector into the fully connected layer to obtain the real face prediction value of the to-be-recognized face, wherein the fully connected layer is used to represent a corresponding relationship between the fusion feature vector and the real face prediction value.

7. The method according to claim 1, wherein the real face prediction value calculation model is obtained by training by:
    acquiring an initial real face prediction value calculation model;
    acquiring a plurality of real face image samples and a plurality of non-real face image samples captured by the near-infrared device as a sample set, wherein the real face image samples comprise near-infrared facial image samples, brightness difference image samples and brightness difference based facial contour samples of a real face captured under different near-infrared illumination, and the non-real face image samples comprise near-infrared facial image samples, brightness difference image samples and brightness difference based facial contour samples of a real face image captured under different near-infrared illumination; and
    training the initial real face prediction value calculation model to obtain the real face prediction value calculation model using each sample in the sample set as input data, and using a manually annotated numerical sample corresponding to each sample as corresponding output data.

8. An apparatus for recognizing a face, the apparatus comprising:
    at least one processor; and
    a memory storing instructions, the instructions when executed by the at least one processor, cause the at least one processor to perform operations, the operations comprising:
    acquiring at least two facial images of a to-be-recognized face under different illuminations using a near-infrared photographing device;
    generating at least one difference image based on a brightness difference between each two of the at least two facial images;
    determining a facial contour image of the to-be-recognized face based on the at least one difference image;

inputting the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and outputting prompt information for indicating successful recognition of a real face, in response to determining the obtained real face prediction value being greater than a preset threshold.

9. The apparatus according to claim 8, wherein the near-infrared photographing device comprises an illumination lamp; and the acquiring at least two facial images of a to-be-recognized face under different illuminations using a near-infrared photographing device, comprises:

acquiring respectively a first facial image of the to-be-recognized face under no illumination of the illumination lamp, a second facial image when the illumination lamp illuminates a first side of the to-be-recognized face, and a third facial image when the illumination lamp illuminates a second side of the to-be-recognized face.

10. The apparatus according to claim 9, wherein the generating at least one difference image based on a brightness difference between each two of the at least two facial images, comprises:

generating a first difference image based on a brightness difference between the first facial image and the second facial image, and generating a second difference image based on a difference between the first facial image and the third facial image.

11. The apparatus according to claim 10, wherein the determining a facial contour image of the to-be-recognized face based on the at least one difference image, comprises:

determining a maximum pixel value in the first difference image and the second difference image;

determining respectively a ratio of the first difference image to the maximum pixel value and a ratio of the second difference image to the maximum pixel value, to obtain a first ratio image and a second ratio image; and marking a position of a brightness change in the first ratio image and a position of a brightness change in the second ratio image, and defining the marked first ratio image and the marked second ratio image as the facial contour image.

12. The apparatus according to claim 8, wherein the real face prediction value calculation model comprises a convolutional neural network, and the convolutional neural network comprises a convolutional layer and a fully connected layer.

13. The apparatus according to claim 12, wherein the inputting the at least two facial images, the at least one difference image, and the facial contour image into a pre-trained real face prediction value calculation model to obtain a real face prediction value of the to-be-recognized face, comprises:

inputting the at least two facial images, the at least one difference image, and the facial contour image into the convolution layer to obtain a fusion feature vector of the at least two facial images, the at least one difference image, and the facial contour image, wherein the convolution layer is used to represent a corresponding relationship between the facial images, the difference image, the facial contour image and the fusion feature vector; and inputting the obtained fusion feature vector into the fully connected layer to obtain the real face prediction value of the to-be-recognized face, wherein the fully connected layer is used to represent a corresponding relationship between the fusion feature vector and the real face prediction value.

14. The apparatus according to claim 8, wherein the real face prediction value calculation model is obtained by training by:

acquiring an initial real face prediction value calculation model;

acquiring a plurality of real face image samples and a plurality of non-real face image samples captured by the near-infrared device as a sample set, wherein the real face image samples comprise near-infrared facial image samples, brightness difference image samples and brightness difference based facial contour samples of a real face captured under different near-infrared illumination, and the non-real face image samples comprise near-infrared facial image samples, brightness difference image samples and brightness difference based facial contour samples of a real face image captured under different near-infrared illumination; and training the initial real face prediction value calculation model to obtain the real face prediction value calculation model using each sample in the sample set as input data, and using a manually annotated numerical sample corresponding to each sample as corresponding output data.

15. A non-transitory computer storage medium storing a computer program, the computer program when executed by one or more processors, causes the one or more processors to perform operations, the operations comprising:

acquiring at least two facial images of a to-be-recognized face under different illuminations using a near-infrared photographing device;

generating at least one difference image based on a brightness difference between each two of the at least two facial images;

determining a facial contour image of the to-be-recognized face based on the at least one difference image;

inputting the at least two facial images, the at least one difference image, and the facial contour image into a pre-trained real face prediction value calculation model to obtain a real face prediction value of the to-be-recognized face, the real face prediction value calculation model being used to represent a corresponding relationship between the at least two facial images, the at least one difference image, the facial contour image and the real face prediction value; and outputting prompt information for indicating successful recognition of a real face, in response to determining the obtained real face prediction value being greater than a preset threshold.

* * * * *